United States Patent [19]

Petersen

[11] Patent Number: 4,509,910

[45] Date of Patent: Apr. 9, 1985

[54] COLUMN CLAMPING ASSEMBLY

[75] Inventor: Paul S. Petersen, Minnetonka, Minn.

[73] Assignee: MTS Systems Corporation, Eden Prairie, Minn.

[21] Appl. No.: 553,363

[22] Filed: Nov. 18, 1983

[51] Int. Cl.³ .............................................. B29F 1/00
[52] U.S. Cl. ................................ 425/451.9; 425/595; 425/DIG. 223; 100/214
[58] Field of Search .......... 425/DIG. 223, 150, 450.1, 425/451, 451.2, 451.9, 589, 590, 595, 149; 100/214

[56] References Cited

U.S. PATENT DOCUMENTS

| | | | |
|---|---|---|---|
| 2,711,561 | 6/1955 | Studli | 425/589 X |
| 3,449,795 | 6/1969 | Fischbach. | |
| 3,465,387 | 9/1969 | Allard et al. | 425/149 |
| 3,656,877 | 4/1972 | Cloki | 425/590 X |
| 3,729,283 | 4/1973 | Eggenberger et al. | 425/451.2 |
| 3,801,256 | 4/1974 | Farrell | 425/590 X |
| 4,094,621 | 6/1978 | Hehl | 425/450.1 X |
| 4,304,540 | 12/1981 | Hammon | 425/150 |

FOREIGN PATENT DOCUMENTS 1506377 11/1967 France .

Primary Examiner—J. Howard Flint, Jr.
Attorney, Agent, or Firm—Kinney & Lange

[57] ABSTRACT

A clamp assembly for selectively clamping a movable cross-head assembly to each column of a press having a plurality of columns. The clamp assembly includes an inner clamp sleeve positioned concentrically about each column. The inner clamp sleeve is slidably longitudinal with respect to the column and has an inner generally cylindrical surface for engaging the column. An outer clamp sleeve is secured to the cross-head assembly concentrically about the inner clamp sleeve. The inner and outer clamp sleeves are threadeably secured together to limit longitudinal movement of one clamp sleeve with respect to the other. Although threaded together, there is sufficient clearance between the opposing threads of the inner and outer clamp sleeves to define a helical chamber therebetween. A hydraulic fluid system is provided for selectively introducing pressurized hydraulic fluid into the helical chamber. The pressure of the hydraulic fluid causes the inner clamp sleeve to shrink so that its inner surface is urged substantially uniformly against the column to limit longitudinal movement of the cross-head assembly with respect to the column.

20 Claims, 6 Drawing Figures

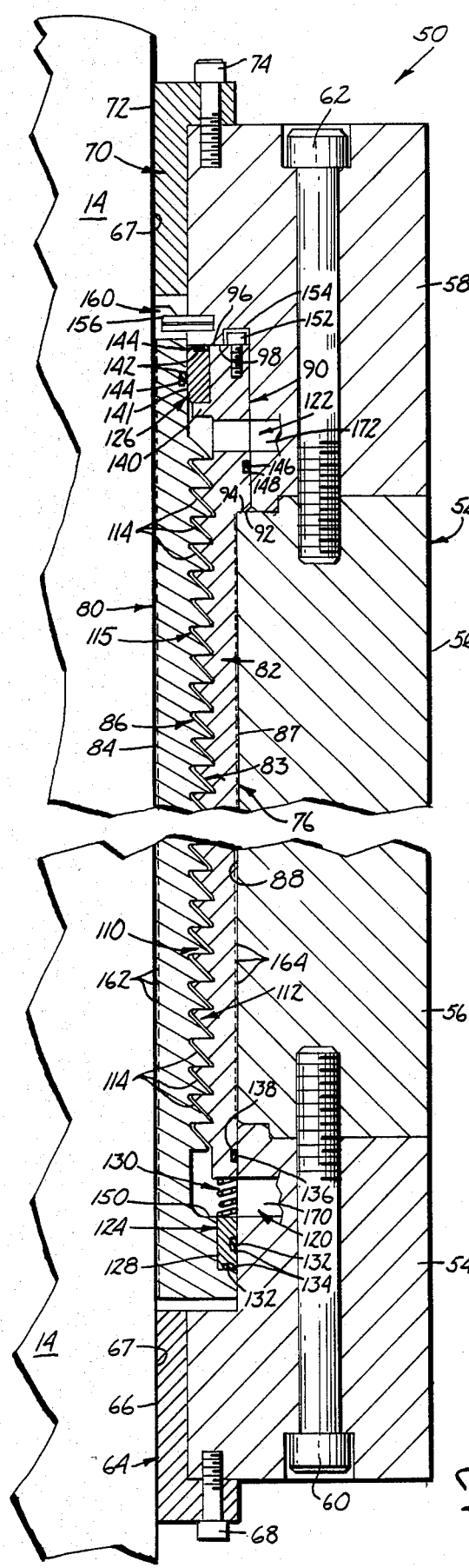
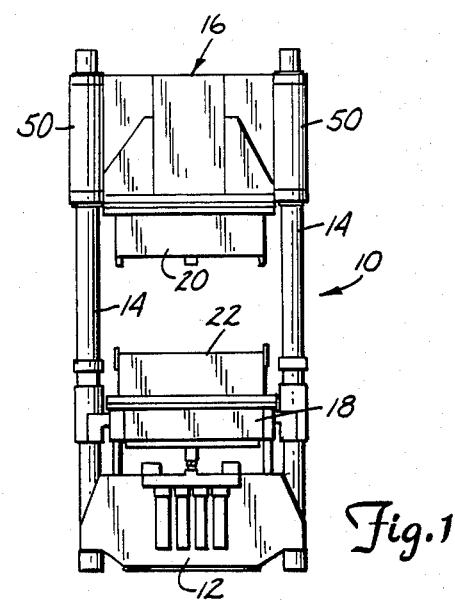
Fig.1
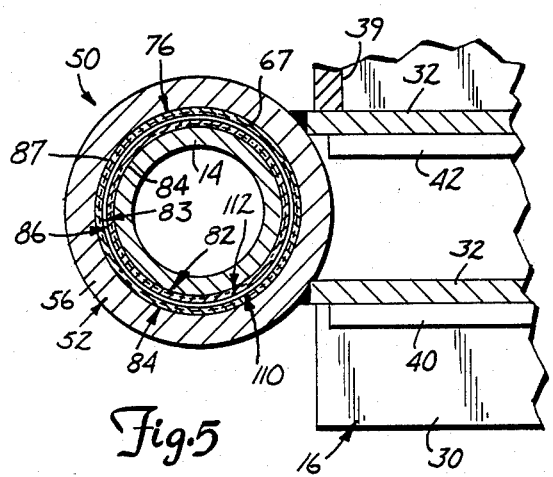
Fig.5
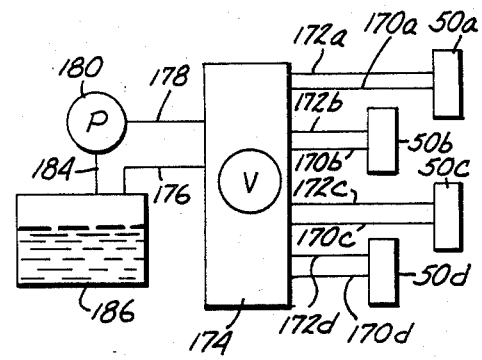
Fig.6
Fig.4

COLUMN CLAMPING ASSEMBLY

BACKGROUND OF THE INVENTION

1. Field of the Invention

The present invention relates to clamp assemblies for securing a movable member to a column, and specifically to a clamp assembly for selectively clamping a movable cross-head to each column of a press having a plurality of columns.

2. Description of the Prior Art

In presses of many kinds it is necessary to secure a movable cross-head with respect to the columns of the press at one or more positions relative to the columns and the base of the press. For example, injection molding machines commonly comprise a two-part mold, and generally one half of this mold is mounted on a lower platen while the other half is mounted on an upper movable platen or cross-head to allow the mold to be opened and closed. Typically, one or more driving ram or cylinder assemblies is required for opening and closing the mold. Moldings are produced by injecting the material to be molded into the mold cavity under pressure. In the course of such injection, a force is built up which tends to separate the lower platen and cross-head to open the mold. In order to prevent this, it is necessary to firmly maintain the position of the lower platen with respect to the cross-head by a force at least as strong as the force created by the injected material. Rapid opening and closing of the mold is also desired in order to achieve economically advantageous production quantities.

Opposed hydraulic cylinders to force the lower platen and cross-head together is one method that has been tried to overcome the molding forces. Additionally, it has been common to devise means for clamping the cross-head in some fashion to the columns to limit its movement with respect thereto. For example, in United States Patent No. 4,304,540, granted to Hammon on Dec. 8, 1981, a hydraulic press is shown wherein the upper platen is secured vertically in position relative to the press columns by a plurality of wedge-shaped segments having teeth which engage a plurality of annular grooves on the column. The teeth of the segments are moved into engagement with the grooves of the column by a plurality of hydraulic cylinders which, when actuated, force the segments radially inwardly toward the columns. Similar column gripping arrangements are shown in the following British Patents:

| British Pat. No. | Grantee | Publication Date |
|---|---|---|
| 803,553 | Fabbrica Italiana Macchine Stampaggio ad Iniezione | 10/29/1958 |
| 1,512,449 | Klockner-Werke Aktiengesellschaft | 06/01/1978 |
| 1,519,025 | Klockner-Werke Aktiengesellschaft | 07/26/1978 |

Another method of clamping a member to a column is to position a U-shaped web about the column and exert pressure to urge the ends of the U together so that the web grips the column. Such a column gripping device is shown in U.S. patent application Ser. No. 493,651, filed May 11, 1983 on behalf of Martin M. Gram (a continuing application based on U.S. patent application Ser. No. 237,690, filed Feb. 24, 1981).

SUMMARY OF THE INVENTION

The present invention is a clamp assembly for securing a movable member to a column which includes a clamp sleeve slidable longitudinally with respect to the column. The clamp sleeve has an outer surface and an inner surface having a cross-section mating with the cross-section of the column for selectively engaging the column. A housing portion adapted to be attached to a movable member is positioned about the clamp sleeve and has a first portion mating with the clamp sleeve and which in combination with the outer surface of the clamp sleeve defines a sealed chamber therebetween surrounding the clamp sleeve. Means are provided for limiting movement of the clamp sleeve longitudinally with respect to the housing portion and means are provided for selectively supplying pressurized fluid to the chamber between the housing and the clamp sleeve. The pressurized fluid in the chamber causes the clamp sleeve to shrink so that the inner surface thereof engages the column to secure the clamp sleeve, housing portion and attached movable member with respect to the column.

In a preferred embodiment, the clamp assembly of the present invention is designed for use in selectively clamping a movable cross-head to each column of a press having a plurality of columns. The longitudinal movement limiting means comprises mated threaded portions on the clamp sleeve and housing portions, with said mated threaded portions being positioned concentrically about the column and having sufficient clearance therebetween to define the chamber. Preferably, the threaded portions are designed to constitute a 90° angle buttress thread with respect to the axis of the column. The buttress thread is designed to have a relatively large clearance between the opposing threads of the threaded portions.

The pressurized fluid supply means also includes means for selectively exhausting pressurized fluid from the chamber between the housing portion and the clamp sleeve. Sufficient clearance exists between the housing and the clamp sleeve so that when pressurized fluid is exhausted from the chamber, the clamp sleeve expands to permit longitudinal movement of the attached movable member with respect to the column. Preferably, the clamp assembly has means for preloading the clamp sleeve into a mated position longitudinally with respect to the housing portion when pressurized fluid is introduced into the chamber.

The clamp assembly of the present invention is much simpler, yet more effective, than prior art devices. A larger clamping surface is provided between the clamp assembly and the column being clamped than was possible in the same amount of longitudinal clamp space used by prior art devices. In addition, the clamping force is applied more uniformly to the column.

BRIEF DESCRIPTION OF THE DRAWINGS

FIG. 1 (Sheet 1) is a front elevational view of a compression molding press including the column clamping assembly of the present invention.

FIG. 4 (Sheet 1) is a partial sectional view taken along lines 4—4 in FIG. 3, with some parts broken away.

FIG. 5 (Sheet 1) is a partial sectional view taken along lines 5—5 in FIG. 2, with some parts broken away.

FIG. 6 (Sheet 1) is a schematic representation of the hydraulic control system used for actuating the column clamp assembly of the present invention.

DETAILED DESCRIPTION OF THE PREFERRED EMBODIMENTS

Figure 3:
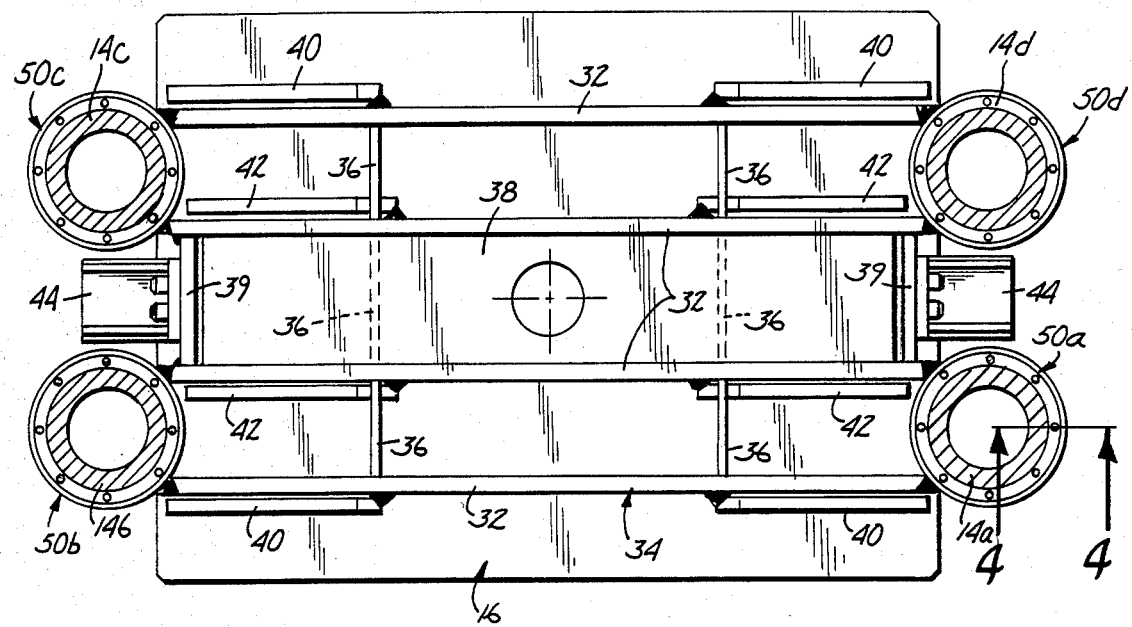
FIG. 3 (Sheet 2) is a sectional view taken along lines 3—3 in FIG. 2.

A compression molding press illustrated generally at 10 in FIG. 1 (sheet 1) is supported on a base 12, and in a usual manner includes four upright cylindrical columns 14, which mount an upper platen assembly or crosshead 16. The crosshead 16 is movable vertically along the columns 14 (once it is mounted in place) through the use of lifting means, which typically comprise a pair of hydraulic lift actuators (not shown) acting in parallel between the base 12 and the crosshead 16.

A lower platen assembly 18 is supported on the base 12. A compression molding assembly is typically mounted between the lower platen assembly 18 and the upper platen or crosshead 16. Such a molding assembly includes an upper mold member 20 and a lower mold member 22. The upper mold member 20 is bolted or otherwise mounted on the crosshead 16 in a desired manner, and similarly, the lower mold member 22 is supported on the lower platen 18 by bolting or as desired.

CROSSHEAD ASSEMBLY

Figure 2:
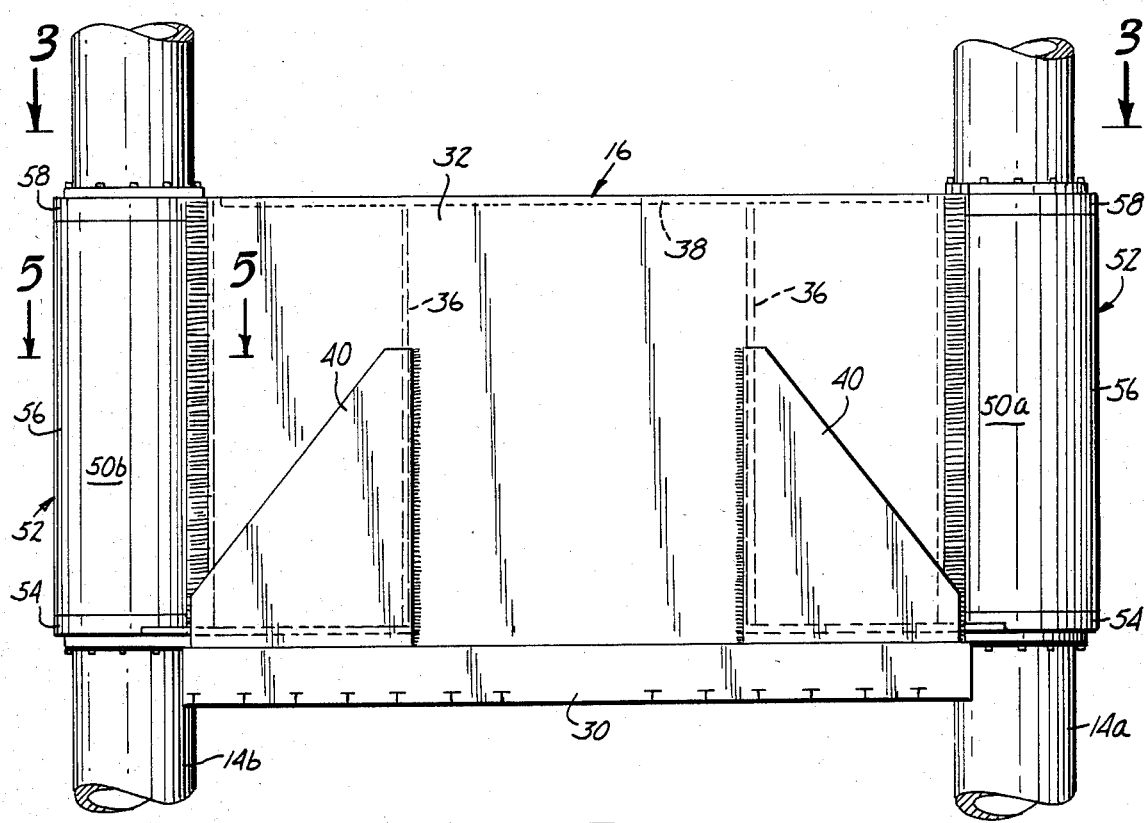
FIG. 2 (Sheet 2) is a front elevational view of a hydraulic press cross-head for use with the column clamp assembly present invention, with some parts broken away.

As perhaps best shown in FIGS. 2 and 3 (Sheet 2), the crosshead 16 includes a flat plate 30. A plurality of shear webs or plates 32 are secured to the flat plate 30 to extend perpendicularly from an upper side thereof. The shear webs 32 comprise generally rectangular plates that are spaced apart and parallel to each other. In the center section 34 of the crosshead 16, a box section is formed by securing vertical tie plates 36 between each of the adjacent shear webs 32 as shown. The tie plates 36 extend from the flat plate 30 adjacent a lower edge of the shear webs 32 to adjacent an upper edge of the shear webs 32. A cover plate 38 extends between the top edges of the two inner shear webs 32 as shown. A side load plate 39 is secured between the inner shear webs 32 at each side of the crosshead 16, as best shown in FIG. 3.

A plurality of outer enforcing gussets or webs 40 are additionaly secured between the outer shear webs 32 and the flat plate 30 as shown. A plurality of inner reinforcing gussets or webs 42 are additionally secured between the inner shear webs 32 and the flat plate 30 as shown. The webs 40 and 42 are triangularly-shaped plates that extend at an oblique angle to the plane of the shear webs 32 to reinforce the structure of the crosshead 16. The webs 40 and 42 carry loads from the edges of the flat plate 30 back to the center section 34 of the crosshead 16. This structural arrangement provides desirable deflection characteristics for the crosshead 16, characteristics which are required for counteracting the molding forces created during the molding process.

CROSSHEAD CLAMPS

The crosshead 16 is, as previously mentioned, movable along the columns 14 through the use of lift actuators acting between the base 12 and the crosshead 16. In one preferred embodiment, there are two lift actuators which are hydraulic cylinders, with each cylinder having one of its ends secured to a load bracket 44 mounted on the respective side load plate 39 of the crosshead 16. In molding operations, the crosshead 16 is moved toward the base 12 to engage the upper and lower mold members 20 and 22. It it then necessary to clamp the crosshead 16 in position (relative to the base 12) for molding. The present invention provides a column clamping assembly for affirmatively securing the crosshead 16 in position relative to the base 12 and the columns 14.

As shown in FIG. 3, a press typically has four columns, referenced as columns 14a, 14b, 14c and 14d. A separate column clamping assembly, indicated generally at 50, is slidably fitted about each column 14. The column clamping assemblies 50 are hydraulically actuated, and operate in parallel for each of the columns 14 of the press. The shear webs 32 of the crosshead 16 are spaced apart, as was explained, and each column 14 and column clamping assembly 50 is positioned in the space between two adjacent shear webs 32. Each column clamping assembly 50 is secured to the side edges of its respective shear webs 32 by suitable means, such as welding, and aligned so that when placed about a column 14, the flat plate 30 of the crosshead 16 is generally perpendicular to the column 14.

As best shown in FIGS. 4 and 5, (Sheet 1) each clamping assembly 50 includes a cylindrical housing portion 52 slidably fitted about its respective column 14. Each housing portion 52 includes three sections, a lower section 54, a central section 56 and an upper section 58. The lower section 54 and central section 56 are secured together by suitable fastening means, such a plurality of bolts 60, one of which is illustrated in FIG. 4. Similarly, the upper section 58 and central section 56 are secured together by suitable fastening means, such as a plurality of bolts 62, one of which is illustrated in FIG. 4. The housing portion 52 of the column clamping assembly 50 is fixedly secured to the crosshead 16 as described above and shown in FIG. 5.

An annular bearing plate 64 is secured to the lower section 54 of the housing portion 52 adjacent a lower end thereof. The annular bearing plate has an inner cylindrical surface 66 which mates slidably and concentrically with an outer cylindrical surface 67 of the column 14. The bearing plate 64 is secured between the lower section 54 and the column 14 by suitable fastening means, such as a plurality of bolts 68, one of which is illustrated in FIG. 4. Similarly, an annular bearing plate 70 is secured to the upper section 58 of the housing portion 52 adjacent an upper end thereof. An inner cylindrical surface 72 of the bearing plate 70 mates with the outer cylindrical surface 67 of the column 14 slidably and concentrically. The bearing plate 70 is secured between the upper section 58 and the column 14 by suitable fastening means, such as a plurality of bolts 74, one of which is illustrated in FIG. 4.

The inner surfaces 66 and 72 of the bearing plates 64 and 70 preferably consist of nylon or some similar low friction material to facilitate the sliding of the housing portion 52 (and, in turn, the clamping assembly 50 and crosshead 16) along the longitudinal length of the column 14. In addition, the bearing plates 64 and 70 guide the crosshead 16 longitudinally with respect to the column 14.

When the housing portion 52, including the bearing plates 64 and 70 are slidably positioned about the column 14, a cylindrically-shaped chamber 76 is defined between the outer cylindrical surface 67 of the column 14, the bearing plates 64 and 70 and the housing portion 52, as best shown in FIGS. 4 and 5. The majority of the chamber 76 is occupied by a pair of co-acting portions of the clamping assembly, an elongated inner clamp sleeve 80 and an elongated outer clamp sleeve 82.

The inner clamp sleeve 80 (generally cylindrical in shape) is positioned concentrically about the column 14 and slidable longitudinally with respect thereto. As best shown in FIG. 5, the inner clamp sleeve 80 has an outer surface 83 and a circular lateral cross-section defining an inner generally cylindrical surface 84 which mates with a circular lateral cross section of the column 14 which defines the outer cylindrical surface 67 thereof. The inner surface 84 of the inner clamp sleeve 80 is so configured to selectively engage the column 14 in the manner described below.

The outer clamp sleeve 82 is also generally cylindrical and positioned concentrically about the column 14. The outer clamp sleeve 82 is also concentrically positioned about the inner clamp sleeve 80. The outer clamp sleeve 82 has an inner surface 86 and an outer surface 87. The outer surface 87 of the outer clamp sleeve 82 mates with a cylindrical surface 88 defined by a circular lateral cross-section of the central section 56 of the housing portion 52, as best shown in FIGS. 4 and 5. The outer clamp sleeve 82 is fixed in position longitudinally with respect to the housing by suitable means, such as having an annular shoulder 92 which engages an opposing annular shoulder 94 on the central section 56 of the housing portion 52. An annular top surface 96 of the outer clamp sleeve 82 is engaged by an opposing annular surface 98 on the upper section 58. Thus, when these components are assembled as shown in FIG. 4, the outer clamp sleeve 82 cannot move longitudinally with respect to the housing portion 52 and is essentially a fixed portion of the housing portion 52.

The inner and outer clamp sleeves 80 and 82 are threaded together by threaded portions 110 and 112 thereon, respectively. Preferably, the threaded portion 110 of the inner clamp sleeve 80 comprises male threads and the threaded portion 112 of the outer clamp sleeve 82 comprises female threads. The male threads of the threaded portion 110 extend helically about the outer surface 83 of the inner clamp sleeve 80 and concentrically with respect to the column 14. Similarly, the female threads of the threaded portion 112 extend helically about the inner surface 86 of the outer clamp sleeve 82 and concentrically with respect to the column 14. When the clamp sleeves 80 and 82 are threaded together, the threaded portions 110 and 112 of the inner and outer clamp sleeves 80 and 82 mate together generally as illustrated in FIG. 4 so that longitudinal movement of one clamp sleeve with respect to the other is limited.

In a preferred embodiment, the inner and outer clamp sleeves 80 and 82 are threaded together with a 90° contact angle buttress thread with a relatively large annular clearance 114 between the opposing thread surfaces. This clearance is shown in FIG. 4, which also shows that the engaging portions of the 90° contact angle buttress thread are perpendicular with respect to the axis of the column 14. The clearance 114 is sufficient to define a helical chamber 115 generally concentrically about the column 14 extending the entire longitudinal length of the threaded engagement of the inner and outer clamp sleeves 80 and 82. An inlet port 120 communicates with a lower end of the helical chamber 115 and an outlet port 122 communicates with an upper end of the helical chamber 115, as shown in FIG. 4.

The helical chamber 115 is sealed at its lower and upper ends by annular seal rings 124 and 126, respectively. Seal ring 124 is retained in an annular cavity 128 concentrically about the column 14 between a lower end of the inner clamp sleeve 80 and the lower section 54 of the housing portion 52. The seal ring 124 is spring-loaded into the cavity 128 by a spring 130 placed in compression between a lower end of the outer clamp sleeve 82 and the seal ring 124. In addition to the seal ring 124, a plurality of O-rings 132 are concentrically retained in annular cavities 134 between the seal ring 124 and the inner clamp sleeve 80 and between the seal ring 124 and the lower section 54. An O-ring 136 is also concentrically retained in an annular cavity 138 between the outer clamp sleeve 82 and the lower section 54 to assure sealing of the helical chamber 115.

The annular seal ring 126 adjacent the upper end of the helical chamber 115 rests on an annular shoulder 140 of the outer clamp sleeve 82 which projects toward the inner clamp sleeve 80 as shown. The seal ring 126 is retained concentrically about the column 14 in a cavity 141 defined between the outer and inner clamp sleeves 80 and 82 and the upper section 58 of the housing portion 52. A plurality of O-rings 142 are concentrically retained in annular cavities 144 between the seal ring 126 and the inner clamp sleeve 80 and upper section 58. An O-ring 146 is also concentrically retained in an annular cavity 148 between the outer clamp sleeve 82 and upper section 58 to further seal the helical chamber 115.

The inner clamp sleeve 80 has an annular surface 150 at its lower end which is perpendicular to the axis of the column 14 and faces the chamber 115. There is no similar such surface adjacent the upper end of the inner clamp sleeve 80.

When assembled as shown in FIG. 4, rotational movement of the outer clamp sleeve 82 with respect to the housing portion 52 (about the axis of the column 14) is prevented by one or more stop members 152 extending upwardly from the annular top surface 96 of the outer clamp sleeve 82. The upper section 58 of the housing portion 52 has a cavity 154 designed to retain each stop member 152 as shown. Rotational movement of the inner clamp sleeve 80 with respect to the housing portion 52 (about the axis of the column 14) is prevented by one or more stop pins 156. One end of each stop pin 156 is retained in a generally vertical bore 158 in the upper section 58 and the other end of each stop pin 156 extends into a generally vertical slot 160 (partially shown in FIG. 4) adjacent an upper end of the inner clamp sleeve 80.

As illustrated in FIG. 4, the inner surface 84 of the inner clamp sleeve 80 is provided with a series of helical drain grooves 162. Because the crosshead 16 is movable with respect to the columns 14, a certain amount of lubricant or "tramp oil" might remain on the outer surface 67 of each column 14. The drain grooves 162 permit the drainage of such tramp oil out from between the outer surface 67 of the column 14 and the inner surface 84 of the inner clamp sleeve 80 during clamping. A similar series of helical drain grooves 164 is provided between the outer surface 87 of the outer clamp sleeve 82 and the cylindrical surface 88 of the central section 56 of the housing portion 52. The drain grooves 162 and 164 provide means for drawing away excess lubricating or tramp oil from the elements of the column clamping assembly 50 during clamping operations.

HYDRAULIC CONTROL SYSTEM

As stated, the column clamping assembly 50 of the present invention is hydraulically actuated. A hydraulic inlet line 170 is connected to the inlet port 120 of the helical chamber 115 and a hydraulic outlet line 172 is connected to the outlet port 122 of the helical chamber 115. In a press having four columns 14a, 14b, 14c and 14d, there are four corresponding column clamping assemblies 50a, 50b, 50c and 50d for each respectively column, as illustrated schematically in FIG. 6 (Sheet 1). Similarly, each column clamping assembly 50a–50d has a respective hydraulic inlet line 170a–170d and a hydraulic outlet line 172a–172d.

The inlet and outlet lines 170 and 172 are connected to a valve 174 which relatively controls the flow of hydraulic fluid through the lines. The valve 174 is a standard solenoid-controlled valve having desired valve sections. A pump 180 has its inlet connected to a reservoir 186 by a line 184 and its pressure outlet line 178 is connected to valve 174. A return line 176 is connected from valve 174 to the reservoir in a conventional manner. Selective actuation of the valve 174 controls the flow of pressurized hydraulic fluid to and from the column clamping assemblies 50. Valve 174 has sections which can be individually opened and closed for flow so that flow from the outlet port 122 and line 172 may be restricted and blocked when the chamber 115 is to be subjected to pressure. As shown, the column clamping assemblies 50 are connected in parallel to be operated simultaneously.

OPERATION

The column clamping assembly 50 of the present invention is actuated by the introduction of pressurized hydraulic fluid into the helical chamber 115 between the inner and outer clamp sleeves 80 and 82. Manipulation of the valve 174 permits pressurized hydraulic fluid to flow through hydraulic inlet line 170 and inlet port 120 into the lower end of the helical chamber 115. The hydraulic fluid then flows into the chamber 115 and helically upwardly about the column 14 to the upper end of the helical chamber 115. The outlet line 172 is blocked so that the pressure of the fluid in the helical chamber 115 causes the inner clamp sleeve 80 to shrink or deform so that the inner surface 84 thereof uniformly engages the outer surface 67 of the column to secure the inner clamp sleeve 80 to the column 14. The increased pressure in the helical chamber 115 in effect causes the inner surface 84 of the inner clamp sleeve 80 to be urged substantially uniformly against the outer surface 67 of the column 14.

The engaging portions of the buttress threaded portions 110 and 112 of the inner and outer clamp sleeves 80 and 82 prevent axial movement of the outer clamp sleeve 82 with respect to the inner clamp sleeve 80. Thus, when the inner clamp sleeve 80 is shrunk against the column 14, movement of the outer clamp sleeve 82 (and its attached movable member or crosshead 16) is secured to the column 14 to limit longitudinal movement with respect thereto. A key feature of this assembly is the thread design of the threaded portions 110 and 112. The threaded portions 110 and 112 engage to limit longitudinal movement of one clamp sleeve with respect to the other but have sufficient clearance between the opposing surfaces of the threads to permit flow of pressurized fluid in the helical chamber 115 between the inner and outer clamp sleeves 80 and 82.

During the clamping process, the inner clamp sleeve 80 is preloaded with respect to the outer clamp sleeve 82. The pressurized fluid in the helical chamber 115 causes a force to be exerted on the annular surface 150 at the lower end of the inner clamp sleeve 80. Since the inner clamp sleeve 80 has no similar opposing surface adjacent its upper end, there is a pressure differential created which urges the inner clamp sleeve 80 toward a preloaded or mated position (as shown in FIG. 4) with respect to the outer clamp sleeve 82. This preload position positively engages the engaging portions of the opposing threads. Because of the clearance 114 between the opposing thread portions 110 and 112 of the inner and outer clamp sleeves 80 and 82, the inner clamp sleeve 80 is free to "float" a certain amount with respect to the outer clamp sleeve 82 (when the helical chamber 115 is not pressurized). The pressure differential caused by the force of the pressurized hydraulic fluid on the annular surface 150 of the inner clamp sleeve 80 urges the engaging portions of the buttress threads into a positive engagement to eliminate that "float" and limit longitudinal movement of the inner clamp sleeve 80 with respect to the outer clamp sleeve 82.

As the inner clamp sleeve 80 is shrunk against the column 14, any residual lubricant on the outer surface 67 of the column 14 is squished and forced substantially out of the contact area between the inner surface 84 of the inner clamp sleeve 80 and the outer surface 67 of the column 14 by way of the drain grooves 162. Similarly, as the helical chamber 115 is pressurized, lubricant is squished and drained out from between the outer clamp sleeve 82 and central section 56 of the housing by way of drain grooves 164.

To release the gripping force of the column clamping assembly 50 on the column 14, the appropriate section of valve 174 is actuated to open the outlet line 172 to exhaust fluid from the helical chamber 115 via either the inlet port or the outlet port 122 and return the chamber 115 to atmospheric pressure. This allows the inner clamp sleeve 80 to expand to its normal configuration, a configuration which allows sufficient clearance between the facing surfaces 84 and 67 of the inner clamp sleeve 80 and column 14, respectively, to permit the column clamping assembly 50 to slide longitudinally with respect to the column 14.

The crosshead 16 can then be moved longitudinally with respect to the column 14 to its desired new position. Although the fluid in the helical chamber 115 is reduced in pressure, a certain amount of residual fluid remains in the chamber 115. The "squish" of this residual fluid in the clearance area 114 of the helical chamber 115 between the opposing thread portions provides an excellent damper during movement of the crosshead 16 with respect to the columns 14. The residual oil therein absorbs chatter but allows a slot self-alignment of the crosshead 16.

In molding operations, it is often desirable to lower the lower platen assembly 18 while the crosshead 16 remains stationary. When using the column clamping assembly 50 of the present invention in such a situation, the differential pressure caused by the force of the pressurized fluid acting on the annular surface 150 preloads the inner clamp sleeve 80 into position to prevent backlash of the crosshead 16 during retraction of the lower platen assembly 18.

The inner and outer clamp sleeves 80 and 82 are preferably formed as aluminum extrusions or castings. The generally cylindrical surface 84 of the inner clamp sleeve 80 is designed to a clearance fit with respect to the column 14 by about eight to twelve thousands of an inch (0.008"–0.012") on the diameter. Thus, when the helical chamber 115 is pressurized to a pressure of five thousand pounds per square inch (500 psi), the inner clamp sleeve 80 is shrunk against the column 14 and grips at approximately four thousand (4,000) psi with a friction coefficient of 0.15. This, in turn, gives six hundred (600) psi friction. In a preferred embodiment, the inner clamp sleeve 80 is fifty (50) inches long and the column is ten (10) inches in diameter. The contact area between the two is then 1,571 square inches. These dimentions, in combination with the pressure forces mentioned above, provide a holding force by the column clamping assembly of 942,478 pounds per column.

Preferably, the threaded portions 110 and 112 (which comprise the buttress thread) include two threads per inch, which gives three thousand five hundred (3,500) inches of thread engagement on a forty-eight (48) inch thread length. The radial width of the engaging portions of the opposing threads is 0.25 inches. This then provides eight hundred seventy-five (875) inches of engaging area of the opposing threads. If, as desired, the modulus of elasticity of the material of the inner clamp sleeve 80 is equal to ten million (10,000,000), the stress in the inner clamp sleeve 80 due to its shrinking against the column 14 is insufficient to create a fatigue problem over time. In addition, with this configuration, stress concentration is inherently "slipped out" at the friction interfaces of the column clamping assembly. This prevents progressive failure which is a common problem in long, cylinder threaded joints.

The use of a 90° contract angle buttress thread is very important in this situation to prevent local load concentration when the column clamping assembly 50 needs to accomodate lateral offset in the molding process. The geometric error due to offset with the 90° engaging portions (perpendicular with respect to the axis of the column) is (delta)(tan helix angle). At two threads per inch and a pitch diamter of 11.2 inches, the helix angle tangent is 0.500/(11.20)(3.142)=0.0142. At an offset of 0.030 (more than would ordinarily occur) the geometric error with the 90° engaging portions to motion equals (0.030)(0.0142)=0.0004 inches. This would be easily absorbed in the elastic range of the extruded aluminum material of the inner and outer clamp sleeves 80 and 82 described above.

Although the present invention has been described with reference to preferred embodiments, workers skilled in the art will recognize that changes may be made in form and detail without departing from the spirit and scope of the invention.

What is claimed is:

1. A clamp assembly for securing a member from relative longitudinal movement with respect to a column comprises:

a clamp sleeve slidable longitudinally with respect to a column, the clamp sleeve having an outer surface and an inner surface having a cross-section mating the cross-section of said column for selectively engaging said column;

a housing portion adapted to be attached to a member and positioned about the clamp sleeve and having a first portion mating with the clamp sleeve and which in combination with the outer surface of the clamp sleeve defines a sealed chamber therebetween surrounding the clamp sleeve;

means for limiting movement of the clamp sleeve longitudinally with respect to the housing portion including a plurality of longitudinally spaced, latterly engaged surfaces respectively on the outer surface of the clamp sleeve and on the first portion for the housing portion; and means for selectively supplying pressurized fluid to the chamber between the housing and the clamp sleeve which causes the clamp sleeve to shrink so that the inner surface thereof engages the column to secure the clamp sleeve, housing portion and attached member with respect to the column.

2. The clamp assembly of claim 1, and further comprising:

means for selectively exhausting pressurized fluid from the chamber between the housing portion and the clamp sleeve, with sufficient clearance being provided between the opposing surfaces of the engaging portions on the clamp sleeve and the housing portion so that when pressurized fluid is exhausted from the chamber, the clamp sleeve expands to permit longitudinal movement of the attached member with respect to the column.

3. The clamp assembly of claim 1 wherein the longitudinally spaced engaged surfaces comprises mated threaded portions on the clamp sleeve and housing portion, with said mated threaded portions being positioned concentrically about the column and having sufficient clearance therebetween to define the chamber.

4. The clamp assembly of claim 3 wherein the threaded portions are designed to constitute a 90° contact angle buttress thread with respect to the axis of the column having a relatively large clearance between the opposing threads of the threaded portions.

5. The clamp assembly of claim 1, and further comprising:

means for preloading the clamp sleeve into a mated position longitudinally with respect to the housing portion when pressurized fluid is introduced into the chamber.

6. The clamp assembly of claim 1 wherein the clamp sleeve has an annular surface at one end thereof, with the annular surface being perpendicular to the axis of the column and facing the chamber so that when pressurized fluid is introduced into the chamber the force of the fluid on the annular surface urges the clamp sleeve toward a preload position longitudinally with respect to the clamp sleeve.

7. The clamp assembly of claim 1 and further comprising:

bearing means proximate each end of the housing portion for guiding the attached member along the longitudinal length of the column.

8. The clamp assembly of claim 1 and further comprising:

drain means on the inner surface of the clamp sleeve for allowing lubricants to drain away from the clamp sleeve as it is shrunk about the column.

9. A clamp assembly for a selectively clamping a crosshead from relative longitudinal movement with respect to each column of a press having a plurality of columns, the clamp assembly comprising:

a housing portion slidably fitted about each column, each housing portion being fixedly secured to the crosshead and having a chamber therein positioned concentrically about its respective column;

an inner clamp sleeve positioned concentrically about the column within the chamber of the housing portion, the inner clamp sleeve being slidable longitudinally with respect to the column and having an outer surface and an inner generally cylindrical surface for engaging the column;

an outer clamp sleeve positioned within the chamber concentrically about the column and the inner clamp sleeve, the outer clamp sleeve being fixed longitudinally with respect to the housing and the outer clamp sleeve having engaging portions on an inner surface thereof for contacting similar engaging portions on the outer surface of the inner clamp sleeve to limit longitudinal movement of the inner clamp sleeve with respect to the outer clamp sleeve; and fluid pressure means for selectively introducing pressurized fluid into the chamber and specifically between the inner clamp sleeve and the outer clamp sleeve so that the increased pressure in the chamber causes the inner generally cylindrical surface of the inner clamp member to be urged substantially uniformly against the column to limit longitudinal movement of the crosshead with respect to the column.

10. The clamp assembly of claim 9 wherein the engaging portions on the outer surface of the inner clamp sleeve and on the inner surface of the outer clamp sleeve are threads so that the inner and outer clamp sleeves are threaded together.

11. The clamp assembly of claim 10 wherein the inner and outer clamp sleeves are threaded together with a 90° contact angle buttress thread with respect to the axis of the column and with a relatively large clearance between the opposing thread surfaces.

12. The claim assembly of claim 10 wherein there is a relatively large clearance between the opposing surfaces of the threads to permit the flow of pressurized fluid between the inner and outer clamp sleeves.

13. The clamp assembly of claim 10, and further comprising:

means for selectively exhausting pressurized fluid from the chamber, and sufficient clearance is provided between the opposing surfaces of the threads on the inner and outer clamp sleeves so that when pressurized fluid is exhausted from the chamber, the inner clamp sleeve expands to permit crosshead movement longitudinally with respect to the column.

14. The clamp assembly of claim 9 wherein the inner clamp sleeve is preloaded into engagement with the outer clamp sleeve when pressurized fluid is introduced into the chamber.

15. The clamp assembly of claim 9 wherein the inner clamp sleeve has an annular surface at one end thereof, with the annular surface being perpendicular to the axis of the column and facing the chamber so that when pressurized fluid is introduced into the chamber the force of the fluid on the annular surface urges the inner clamp sleeve toward a preloaded position with respect to the outer clamp sleeve.

16. The clamp assembly of claim 9 wherein the housing portion has bearing means proximate each end of the clamp assembly to guide the clamp assembly along the longitudinal length of the column.

17. The clamp assembly of claim 9 wherein lubricant drain grooves are provided on the face of the inner cylindrical surface of the inner clamp sleeve and between the housing portion and the outer clamp sleeve.

18. The clamp assembly of claim 9 wherein the fluid pressure means includes means for exhausting pressurized fluid from the chamber, and further comprising:

fluid control means for actuating the fluid pressure means to selectively control the introduction and exhaustion of pressurized fluid into the chamber.

19. The clamp assembly of claim 18 wherein the fluid control means actuates simultaneously the fluid pressure means of the clamp assembly for each column of a press having a plurality of columns.

20. A clamp assembly for securing a member from relative longitudinal movement with respect to a cylindrical column comprises:

an elongated inner clamp sleeve positioned concentrically about a column and slidable longitudinally with respect thereto, the inner clamp sleeve having an outer surface and having an inner surface having a circular lateral cross-section mating a circular lateral cross-section of the column;

an elongated outer clamp sleeve positioned concentrically about the inner clamp sleeve, the outer clamp sleeve having an inner surface and being secured to a member;

mated threaded portions on the outer surface of the inner clamp sleeve and inner surface of the outer clamp sleeve, the threaded portions being designed so that when threadably engaged, longitudinal movement of the inner clamp sleeve is limited with respect to the outer clamp sleeve and sufficient clearance is provided between the opposing threads to define a helical chamber between inner and outer clamp sleeves which extends concentrically about the column; and fluid pressure means for selectively introducing pressurized hydraulic fluid into the helical chamber which causes the inner clamp sleeve to shrink so that the inner surface thereof engages the column to secure the inner clamp sleeve, outer clamp sleeve and attached member with respect to the column.

* * * * *